W. B. MACKINTOSH.
GAGE.
APPLICATION FILED JUNE 27, 1918.
1,316,844.
Patented Sept. 23, 1919.
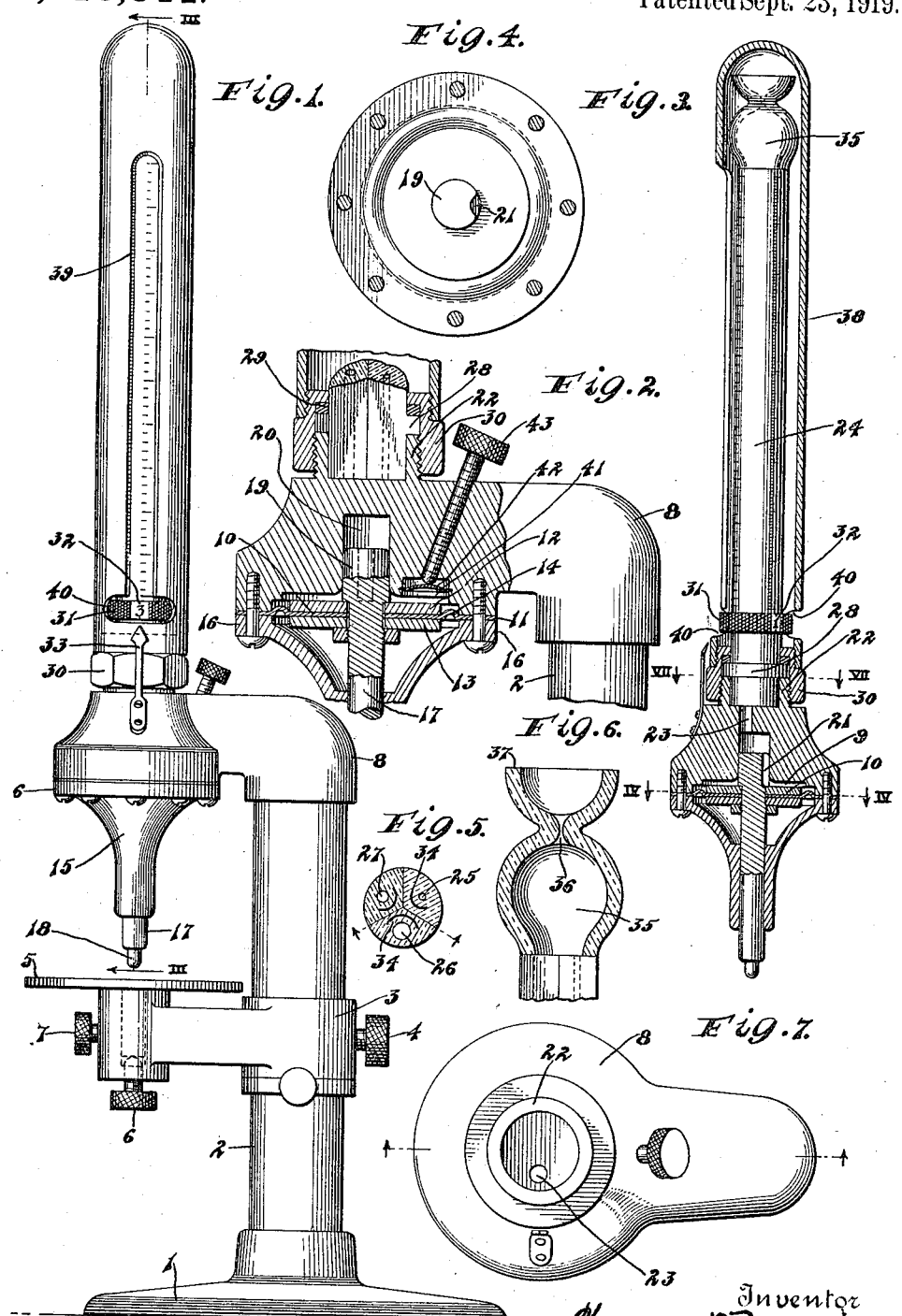

UNITED STATES PATENT OFFICE.

WILLIAM B. MACKINTOSH, OF DETROIT, MICHIGAN, ASSIGNOR TO COATS MACHINE TOOL COMPANY, INC., OF NEW YORK, N. Y., A CORPORATION OF NEW YORK.

GAGE.

1,316,844.   Specification of Letters Patent.   Patented Sept. 23, 1919.

Application filed June 27, 1918. Serial No. 242,209.

*To all whom it may concern:*

Be it known that I, WILLIAM B. MACKINTOSH, a citizen of the United States, and a resident of the city of Detroit, county of Wayne, and State of Michigan, have invented certain new and useful Improvements in Gages, of which the following is a specification.

This invention relates to that class of gages in which a liquid column is employed with means to vary the height of the column, in order to indicate variations in the dimensions of the parts being measured. These devices are in their nature micrometer gages, with a highly sensitive liquid column to indicate variations in the dimensions of the parts measured.

One of the main objects of the invention is to increase the sensitiveness and accuracy of gages of the type herein indicated.

Another object of the invention is to provide a glass to contain the liquid column and to form said glass with a plurality of longitudinal apertures of different diameters, and to so mount the glass that the desired aperture may be brought into register with the liquid chamber of the gage in order to vary the sensitiveness of the device. It is obvious that in gages of this type the finer the column of indicating liquid the more sensitive the device; and it is desirable to vary the sensitiveness of the gage to adapt it for different classes of work.

Another object of the invention is to provide improved means for compensating for varying temperatures, in order that the normal level of the liquid indicating column may be maintained at a fixed point, if desired.

There are other important objects and advantages of the invention which will appear hereinafter.

In the drawing, Figure 1 is a side elevation of the gage;

Fig. 2 a vertical sectional view of the main portion thereof, showing the liquid chamber;

Fig. 3 a vertical sectional view of the gage head and the means for attaching the glass tube for containing the liquid column, the tube being shown in side elevation and the inclosing case being shown in sectional view;

Fig. 4 a horizontal sectional view on the line IV—IV of Fig. 3;

Fig. 5 a transverse sectional view of the glass tube for containing a liquid indicating column;

Fig. 6 a vertical sectional view of the upper end of the glass tube; and

Fig. 7 a plan view of the gage head, the parts above the line VII—VII of Fig. 3 being omitted.

Referring to the various parts by numerals, 1 designates the base of the gage; 2 the vertical post thereof carrying an adjustable collar 3, which may be secured at any desired position on the post 2 by means of the clamping screw 4. The collar 3 carries the gage table 5, which is vertically adjustable in a suitable bracket by means of a screw 6. When properly adjusted the table may be readily secured in position by means of a clamping screw 7. The table 5 forms one of the calipering members. To the upper end of the post 2 is secured the gage head 8, which extends laterally horizontally, and at its end is enlarged to form a liquid chamber 9. The chamber 9 is formed in the under side of the gage head, and the lower wall thereof is formed by a horizontally arranged plunger 10, said plunger consisting of a thin flexible diaphragm 11, clamped between two circular plunger plates 12 and 13, said plates being slightly smaller in diameter than the circular liquid chamber, in order to leave a small annular ring-like portion 14 of the diaphragm free to flex between the marginal edges of the plates and the marginal edge of the liquid chamber. The diaphragm is held in place to the under side of the gage head by means of a depending guide 15, said guide being formed at its upper end with a laterally extending annular flange 16, through which the securing bolts pass. Connected rigidly to the plunger and extending downwardly through the guide 15 is a movable gage member 17, the lower end of said member extending beyond the end of the guide 15 and being formed at its lower end with a calipering point 18. The gage table 5 is adapted to be adjusted to bring it into proper coöperative relation to the point 18. The plunger 10 is provided at its upper surface with a centrally arranged upwardly extending cylindrical guide stem 19, which enters a guiding recess or cavity 20, formed in the gage head. The guide stem 19 is formed with a vertically extending groove 21, which places the upper part of the cavity 20 in communication with the liquid chamber 9 in all positions of the plunger.

The gage head is formed at its upper surface with an upwardly extending annular flange 22, and the space inclosed within said flange is in communication with the cavity 20 through an eccentrically located passage 23. Fitting closely in the flange 22 is the lower end of a gage glass 24, said glass being provided with three longitudinally extending apertures 25, 26 and 27, all of different diameters. The apertures are so arranged in the gage glass that by rotating it within the flange 22 any desired aperture may be brought into register with the passage 23 in the gage head. The lower end of the gage glass is ground to fit very accurately within the flange 22, and on the upper surface of the gage head so that there will be practically no leakage of liquid at the bottom of the glass. The liquid is withdrawn from the aperture in the gage glass before the glass is rotated to bring the new aperture into register with the opening from the fluid chamber. This may be done either by slightly depressing the plunger by means of the movable gage member 17; or by flexing the diaphragm 42 by withdrawing the screw 43.

The gage glass is formed with a collar 28, which is adapted to rest on the upper surface of the flange 22; and on said flange is adapted to be placed a compressible washer 29. The exterior of the flange 22 is threaded to receive a gland nut 30, which is formed with an inwardly extending flange adapted to engage and compress the washer 29, and thereby secure the gage glass in position, and to cause it to bear against the upper surface of the gage head with the desired pressure. Secured to the gage glass is a collar 31, by means of which it may be rotated; and on said collar are placed suitable indicating characters 32, by means of which the desired aperture in the gage glass may be selected and brought into register with the aperture 23 in the gage head. An indicator 33, is rigidly secured to the gage head at the proper point to indicate when the selected aperture is in register with the passage 23.

The gage glass may be formed in any suitable manner, but I prefer to construct it of three separate tubes joined as indicated in Fig. 5, each tube section being provided at the inner side of each aperture with a shield 34 of suitable material, embedded in the glass to facilitate the reading of the position of the liquid column and to shield each aperture from the other apertures in the gage glass. It is manifest that the gage glass may be formed solid with three apertures, but it is thought that it may be more readily formed in sections, and the sections then secured together by a suitable cement. The gage glass will be provided with suitable indicating or gage marks for each aperture, said gage marks being suitably spaced apart to adapt them for use with the particular aperture to which they are applied.

To the upper end of the gage glass is secured a chamber 35 having a restricted passage 36, at its upper end; a filling cup 37, being formed at the top of the chamber 35 and communicating therewith through the restricted passage 36. By providing the enlarged chamber 35 which at its lower end is in communication with all of the apertures in the gage glass, any liquid which might be driven up through the apertures by a sudden upward pressure on the plunger will be caught in said chamber. The passage 36 being out of vertical line with the apertures and being very restricted, will prevent any of the liquid escaping upwardly therethrough. Said passage, however, is of sufficient capacity to permit the device to be filled.

The gage glass is inclosed within a fixed casing 38, whose lower end is screwed to the upper end of the gland nut 30. The said casing is cut out at 39, to expose the gage marks on the gage glass; and is also cut out at 40 to permit of the manipulation of the collar 31.

In order to vary the level of the indicating column of liquid to compensate for variations in temperature, a small chamber 41 is formed in the gage head, the upper wall of said chamber being formed by a small flexible diaphragm 42 of any suitable material. A screw 43 is threaded through the gage head, its lower end engaging the diaphragm in order that said diaphragm may be flexed by rotating said screw. It is manifest that through the operation of the screw 43 the capacity of chamber 9 may be slightly changed to vary the height of the liquid column in the gage glass, in order to bring the column to the proper level, should the normal level be disturbed by changes in temperature.

In the drawings, the guide 19 and the gage member 17 are shown as integral, but of course, it will be understood that they may be formed separately and secured to the plunger 10 in any suitable manner. It is also to be understood that the guide 15 may be dispensed with, and that the gage member 17 may be merely a short calipering point connected directly to the lower side of the plunger 10. The purpose of the guide 19 is to insure the centering of the plunger 10 in all its movements, and to secure a uniform contraction and expansion of the liquid chamber at all points, during the movement of the plunger. The free portion of the diaphragm between the marginal edges of the plunger plates 12 and 13 and the marginal edge of the liquid chamber will be as small as possible, while permitting the necessary vertical movement of the plunger, the purpose being to as nearly as possible secure a uniform expansion and contraction of the liquid chamber during the vibrations of the plunger. This desirable uniform contraction and expansion of the liquid chamber cannot be secured by a simple diaphragm which may be flexed at any point, and which is capable of its greatest distortion at or about its center. Another purpose of forming the plunger plates as large as possible is to reduce the possibility of error through the distortion of the flexible portion of the diaphragm, so that when the plunger returns to its normal position, the indicating column of liquid will return to its normal gage mark. Ordinarily flexible diaphragms are liable to be distorted in operation to such an extent that when the movable gage member is returned to its normal position, the height of the indicating column of liquid will be changed, necessitating a readjustment of the movable gage points ordinarily used on gages of this type.

In using a gage of this character, a standard piece of accurate size is first calipered or gaged and the height of the liquid indicating column is marked with a suitable gage finger or point. Other gage fingers or points are then arranged above and below the standard gage point, these gage points indicating the "over" and "under" size limits. Thereafter in the use of the gage, if the piece gaged is too large the liquid column will rise to a point above the over-size gage point. If the part measured is too small, the liquid column will not rise to the under-size gage point.

Because of the area of the plunger 10, a very slight movement of the movable gage member will cause considerable variation in the height of the liquid column, so that very minute differences in sizes of the parts measured will be greatly magnified by the movements of the indicating column. By providing a gage glass having liquid columns of different diameters, the columns of larger diameter may be used for the larger "over" and "under" size limits.

What I claim is:

1. A gage, comprising a support, a fixed gage member, a movable gage member, a gage head formed with a liquid chamber, a plunger closing the lower side of said chamber, said movable gage member being connected to the under side of said plunger a central rigid vertically extending stem connected to the upper side of said plunger, means for guiding said stem in the gage head, and a gage glass having an aperture in communication with the liquid chamber and provided with gage marks.

2. A gage, comprising a support, a fixed gage member, a movable gage member, a gage head formed with a liquid chamber, a plunger closing the lower side of said chamber and comprising a diaphragm, circular means for holding said diaphragm rigid throughout its area, except for a slight marginal portion adjacent the marginal edge of the liquid chamber, whereby said plunger may be slightly moved vertically, said plunger carrying the movable gage member, a central rigid vertically extending stem connected to the upper side of said plunger, means for guiding said stem in the gage head, and a gage glass having an aperture in communication with the liquid chamber and provided with gage marks.

3. A gage, comprising a support, a rigid gage member carried thereby, a gage head formed with a liquid chamber, a plunger closing the lower side of said chamber, a movable gage member connected to said plunger, a gage glass formed with a plurality of longitudinally extending apertures, and means for mounting the gage glass on the gage head to permit any one of said apertures to be brought into communication with the liquid chamber in the gage head.

4. A gage, comprising a gage head, a gage glass mounted thereon and provided with a plurality of longitudinally extending apertures, and means for causing a column of indicating liquid to rise in any one of said apertures.

5. A gage, comprising a gage head, a gage glass mounted thereon and provided with a plurality of longitudinally extending apertures of different diameters, and means for causing a column of indicating liquid to rise in any one of said apertures.

6. A gage, comprising a support, a rigid gage member carried thereby, a gage head formed with a liquid chamber, a plunger closing the lower side of said chamber, a movable gage member connected to said plunger, a gage glass formed with a plurality of longitudinally extending apertures of different diameters, and means for mounting the gage glass on the gage head to permit any one of said apertures to be brought into communication with the liquid chamber in the gage head.

7. A gage, comprising a gage head, a gage glass mounted thereon and provided with a plurality of longitudinally extending apertures, means for causing a column of indicating liquid to rise in any one of said apertures, and means in the gage glass to shield each of said apertures at the inner side thereof.

8. A gage, comprising a gage head, a gage glass mounted thereon and provided with a plurality of longitudinally extending apertures, means for causing a column of indicating liquid to rise in any one of said apertures, means in the gage glass to shield each of said apertures at the inner side thereof, and an independent set of gage marks for each of said apertures.

9. A gage, comprising a support, a rigid gage member carried thereby, a gage head formed with a liquid chamber, a plunger closing the lower side of said chamber, a movable gage member connected to said plunger, a gage glass formed with a plurality of longitudinally extending apertures, means for mounting the gage glass on the gage head to permit any one of said apertures to be brought into communication with the liquid chamber in the gage head, and means for indicating which of the apertures is in communication with the liquid chamber.

10. A gage, comprising a gage head, a liquid chamber therein, a plunger forming one side of said chamber and carrying a movable gage member, a gage glass having a longitudinal aperture in communication with said liquid chamber, a chamber connected to the upper end of the gage glass and in communication with the longitudinal aperture therein, said chamber being formed with a contracted opening at its upper end, and a filling cup on top of said chamber and in communication with said contracted passage.

This specification signed this 5th day of June A. D. 1918.

WILLIAM B. MACKINTOSH.

Copies of this patent may be obtained for five cents each, by addressing the "Commissioner of Patents, Washington, D. C."